US008335345B2

United States Patent
White et al.

(10) Patent No.: US 8,335,345 B2
(45) Date of Patent: Dec. 18, 2012

(54) TRACKING AN OBJECT WITH MULTIPLE ASYNCHRONOUS CAMERAS

(75) Inventors: Marvin S. White, San Carlos, CA (US); Alina Alt, San Jose, CA (US)

(73) Assignee: Sportvision, Inc., New York, NY (US)

( * ) Notice: Subject to any disclaimer, the term of this patent is extended or adjusted under 35 U.S.C. 154(b) by 1320 days.

(21) Appl. No.: 11/688,149

(22) Filed: Mar. 19, 2007

(65) Prior Publication Data

US 2008/0219509 A1 Sep. 11, 2008

Related U.S. Application Data

(60) Provisional application No. 60/893,082, filed on Mar. 5, 2007.

(51) Int. Cl.
*G06K 9/00* (2006.01)
(52) U.S. Cl. ........ 382/103; 382/106; 382/107; 348/135; 348/139; 348/142; 348/154; 348/159; 348/169; 348/170
(58) Field of Classification Search ................. 382/103, 382/106, 107; 348/47, 48, 135, 138, 139, 348/142, 154, 159, 169, 170
See application file for complete search history.

(56) References Cited

U.S. PATENT DOCUMENTS

| | | | |
|---|---|---|---|
| 3,795,911 A * | 3/1974 | Hammack | 342/106 |
| 4,064,528 A | 12/1977 | Bowerman | |
| 4,084,184 A | 4/1978 | Crain | |
| 4,199,141 A | 4/1980 | Garcia | |
| 4,420,770 A | 12/1983 | Rahman | |
| 4,545,576 A * | 10/1985 | Harris | 473/468 |
| 4,563,005 A | 1/1986 | Hand et al. | |

(Continued)

FOREIGN PATENT DOCUMENTS

GB 2191361 A 12/1987

OTHER PUBLICATIONS

Brand, M. et al. "Flexible flow for 3D nonrigid tracking and shape recovery" Computer Vision and Pattern Recognition, 2001. Proceedings of the 2001 IEEE Computer Society Conference on vol. 1 Publication Year: 2001 , pp. I-315-I-322.*

(Continued)

*Primary Examiner* — Matthew Bella
*Assistant Examiner* — Julian Brooks
(74) *Attorney, Agent, or Firm* — Vierra Magen Marcus & DeNiro LLP

(57) ABSTRACT

The path and/or position of an object is tracked using two or more cameras which run asynchronously so there is need to provide a common timing signal to each camera. Captured images are analyzed to detect a position of the object in the image. Equations of motion for the object are then solved based on the detected positions and a transformation which relates the detected positions to a desired coordinate system in which the path is to be described. The position of an object can also be determined from a position which meets a distance metric relative to lines of position from three or more images. The images can be enhanced to depict the path and/or position of the object as a graphical element. Further, statistics such as maximum object speed and distance traveled can be obtained. Applications include tracking the position of a game object at a sports event.

38 Claims, 11 Drawing Sheets

U.S. PATENT DOCUMENTS

| | | |
|---|---|---|
| 4,591,897 A | 5/1986 | Edelson |
| 4,893,182 A | 1/1990 | Gautraud et al. |
| 4,894,789 A | 1/1990 | Yee |
| 4,905,094 A | 2/1990 | Pocock et al. |
| 5,014,125 A | 5/1991 | Pocock et al. |
| 5,063,603 A | 11/1991 | Burt |
| 5,128,752 A | 7/1992 | Von Kohorn |
| 5,140,419 A | 8/1992 | Galumbeck et al. |
| 5,262,860 A | 11/1993 | Fitzpatrick et al. |
| 5,264,933 A | 11/1993 | Rosser et al. |
| 5,270,820 A | 12/1993 | Fellinger |
| 5,285,278 A | 2/1994 | Holman |
| 5,353,392 A | 10/1994 | Luquet et al. |
| 5,401,016 A | 3/1995 | Heglund et al. |
| 5,413,345 A | 5/1995 | Nauck |
| 5,435,545 A | 7/1995 | Marotta |
| 5,438,355 A | 8/1995 | Palmer |
| 5,443,260 A | 8/1995 | Stewart et al. |
| 5,453,794 A | 9/1995 | Ezaki |
| 5,481,542 A | 1/1996 | Logston et al. |
| 5,488,675 A | 1/1996 | Hanna |
| 5,491,517 A | 2/1996 | Kreitman et al. |
| 5,498,000 A | 3/1996 | Cuneo |
| 5,513,854 A | 5/1996 | Daver |
| 5,523,783 A | 6/1996 | Cho |
| 5,526,035 A | 6/1996 | Lappington et al. |
| 5,534,913 A | 7/1996 | Majeti et al. |
| 5,537,141 A | 7/1996 | Harper et al. |
| 5,543,856 A | 8/1996 | Rosser et al. |
| 5,564,698 A | 10/1996 | Honey et al. |
| 5,566,251 A | 10/1996 | Hanna et al. |
| 5,566,934 A | 10/1996 | Black et al. |
| 5,570,295 A | 10/1996 | Isenberg et al. |
| 5,572,442 A | 11/1996 | Schulhof et al. |
| 5,589,892 A | 12/1996 | Knee et al. |
| 5,604,542 A | 2/1997 | Dedrick |
| 5,610,653 A | 3/1997 | Abecassis |
| 5,612,730 A | 3/1997 | Lewis |
| 5,640,193 A | 6/1997 | Wellner |
| 5,668,629 A | 9/1997 | Parker et al. |
| 5,676,607 A | 10/1997 | Stumpf |
| 5,699,442 A | 12/1997 | Fellinger |
| 5,742,521 A | 4/1998 | Ellenby et al. |
| 5,761,606 A | 6/1998 | Wolzien |
| 5,769,713 A | 6/1998 | Katayama |
| 5,774,664 A | 6/1998 | Hidary et al. |
| 5,778,181 A | 7/1998 | Hidary et al. |
| 5,818,441 A | 10/1998 | Throckmorton et al. |
| 5,905,865 A | 5/1999 | Palmer et al. |
| 5,912,700 A | 6/1999 | Honey et al. |
| 5,917,553 A | 6/1999 | Honey et al. |
| 5,938,545 A * | 8/1999 | Cooper et al. ............... 473/407 |
| 5,984,810 A | 11/1999 | Frye et al. |
| 6,018,768 A | 1/2000 | Ullman et al. |
| 6,031,545 A | 2/2000 | Ellenby et al. |
| 6,072,504 A * | 6/2000 | Segen ........................... 345/474 |
| 6,073,086 A | 6/2000 | Marinelli |
| 6,133,946 A | 10/2000 | Cavallaro et al. |
| 6,154,250 A | 11/2000 | Honey |
| 6,233,007 B1 | 5/2001 | Carlbom et al. |
| 6,257,983 B1 | 7/2001 | Rimoto |
| 6,266,100 B1 | 7/2001 | Gloudemans et al. |
| 6,297,853 B1 | 10/2001 | Sharir et al. |
| 6,320,173 B1 | 11/2001 | Vock et al. |
| 6,353,673 B1 * | 3/2002 | Shnitser et al. ............... 382/103 |
| 6,358,164 B1 | 3/2002 | Bracewell et al. |
| 6,449,382 B1 | 9/2002 | Ciccolo et al. |
| 6,514,081 B1 * | 2/2003 | Mengoli ....................... 434/252 |
| 6,520,864 B1 | 2/2003 | Wilk |
| 6,592,465 B2 | 7/2003 | Lutz et al. |
| 6,690,374 B2 * | 2/2004 | Park et al. ..................... 345/427 |
| 6,774,932 B1 | 8/2004 | Ewing et al. |
| 6,789,039 B1 | 9/2004 | Krumm |
| 6,833,849 B1 | 12/2004 | Kurokawa et al. |
| 7,000,469 B2 | 2/2006 | Foxlin et al. |
| 7,030,905 B2 | 4/2006 | Carlbom et al. |
| 7,086,955 B2 | 8/2006 | Gobush et al. |
| 7,094,164 B2 | 8/2006 | Marty et al. |
| 7,187,401 B2 * | 3/2007 | Alhadef et al. ................ 348/42 |
| 7,327,383 B2 * | 2/2008 | Valleriano et al. ............ 348/143 |
| 7,548,184 B2 * | 6/2009 | Lo et al. .......................... 342/62 |
| 2003/0120448 A1 * | 6/2003 | Moriya et al. .................. 702/95 |
| 2003/0171169 A1 | 9/2003 | Cavallaro et al. |
| 2003/0210329 A1 | 11/2003 | Aagaard et al. |
| 2004/0006424 A1 * | 1/2004 | Joyce et al. ................... 701/207 |
| 2005/0282645 A1 * | 12/2005 | Bissonnette et al. .......... 473/131 |

OTHER PUBLICATIONS

J. Kang et al. "Continuous Multi-Views Tracking using Tensor Voting", Proc. of IEEE WMCV, 2002.

J. Kang et al., "Tracking objects from multiple stationary and moving cameras," Intelligent Distributed Surveillance Systems, IEE, pp. 31-35, Feb. 2004.

H. Fujiyoshi et al., "Fast 3D Position Measurement with Two Unsynchronized Cameras," Proc. 2003 IEEE Int. Symp. on Computational Intelligence in Robotics and Automation, pp. 1239-1244, Jul. 2003.

S. Velipasalar et al. "Frame-level temporal calibration of video sequences from unsynchronized cameras by using projective invariants," 2005 IEEE Conference on Advanced Video and Signal Based Surveillance, pp. 462-467, Sep. 2005.

Y. Wang et al., "Moving object tracking in video," Proc. of the 29th Applied Imagery Pattern Recognition Workshop, pp. 95-101, 2000.

J. Black et al., "Multi camera image tracking," Proc. of the 2nd IEEE Int. Workshop on PETS, Dec. 2001.

L. Wolf et al., "Wide baseline matching between unsynchronized video sequences," Int. J. of Computer Vision, 68(1), pp. 43-52, 2006.

C. Zhou et al., "Dynamic depth recovery from unsynchronized video streams," Proc. 2003 IEEE Computer Society Conference on Computer Vision and Pattern Recognition, Jun. 2003, vol. 2, pp. II-351-8.

E. Trucco and A. Verri, "Introductory techniques for 3-D computer vision," chapter 6, Prentice Hall, 1998.

Digital Vision Network 5000 Series, Johnson Controls Inc., 2004.

* cited by examiner

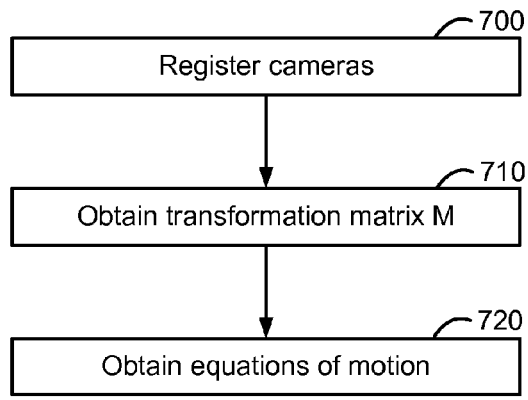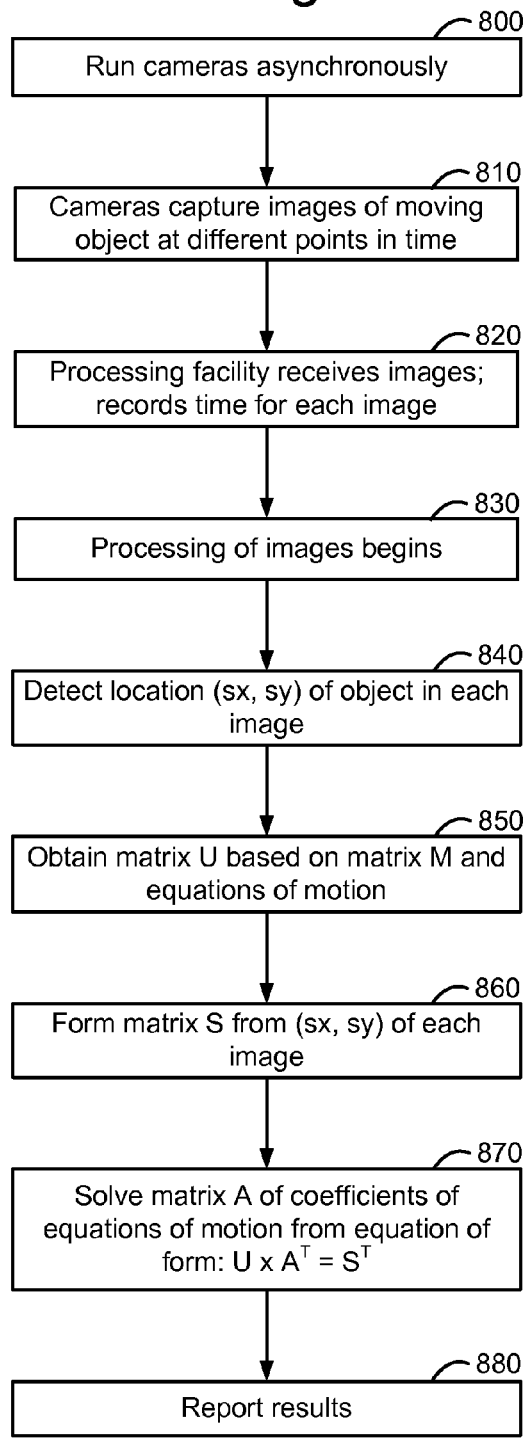

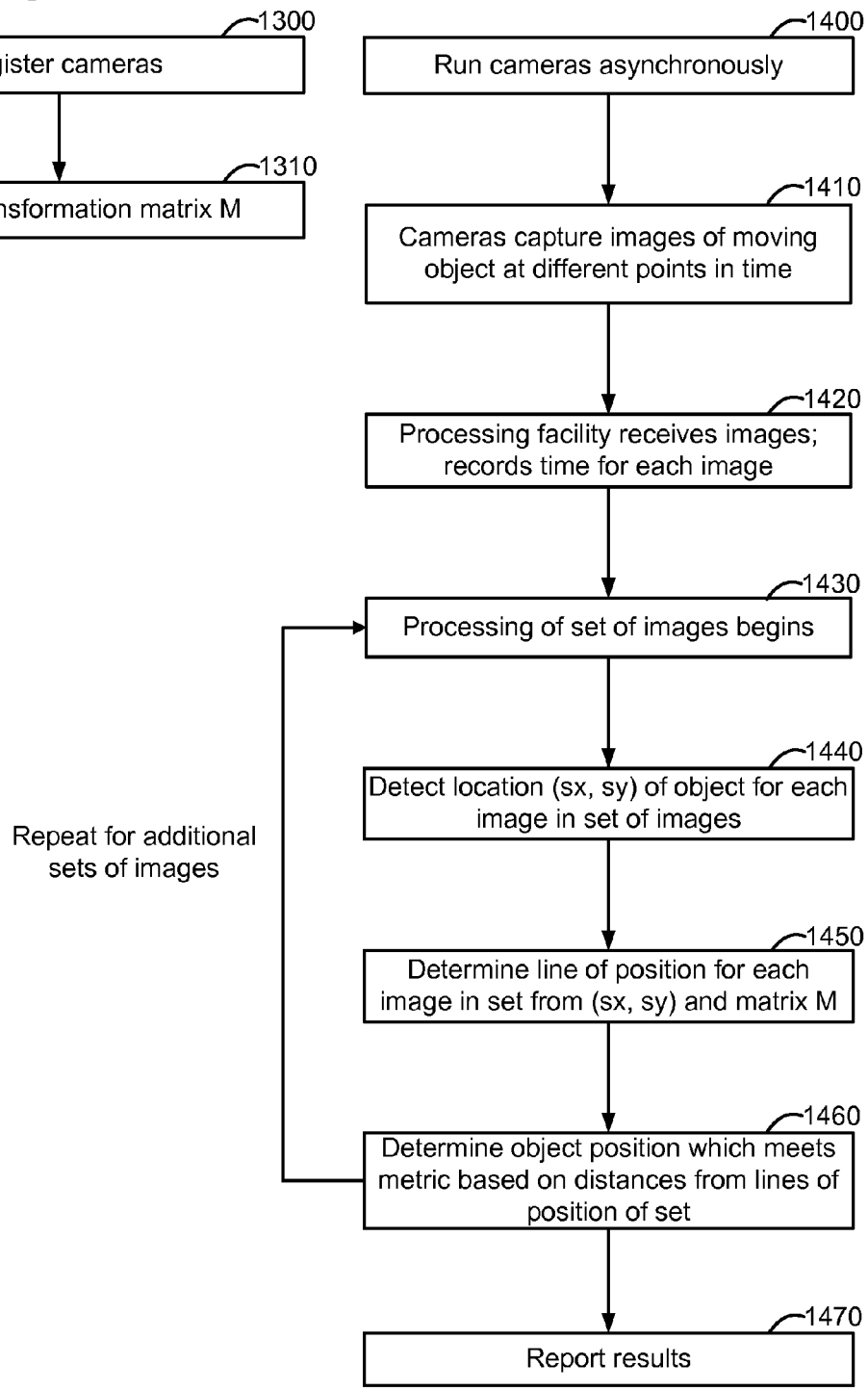

TRACKING AN OBJECT WITH MULTIPLE ASYNCHRONOUS CAMERAS

CROSS-REFERENCE TO RELATED APPLICATIONS

This application claims the benefit of U.S. provisional patent application No. 60/893,082, filed Mar. 5, 2007, and incorporated herein by reference.

BACKGROUND OF THE INVENTION

Many applications employ object tracking techniques. For example, cars and people may be tracked in surveillance applications, the trajectory of a golf ball may be tracked in a golf training aid application, and an object in a sporting event may be tracked to enhance a video presentation of the event. Typically, object tracking techniques use two or more cameras which are synchronized to capture images of the object at the same time. The synchronized images are used to determine or estimate the position of a moving object which is depicted in the synchronized images. However, synchronizing the cameras is cumbersome and time consuming. For example, a high resolution clock signal must be made available simultaneously at each of the cameras, e.g., using the technique referred to as "genlocking" in the broadcast industry. In addition to the extra equipment which is needed, e.g., cables and connectors, and the labor required to provide the clock signal, which is in itself a significant part of system set up, failures can be difficult to detect. As a result, the quality of the resulting position estimate can be questionable. One subtle way in which the synchronization can fail is when the signal path of a clock signal to the cameras has inadequate termination. This can cause signal reflections and signal delays, effectively destroying the synchronization.

SUMMARY OF THE INVENTION

The present invention addresses the above and other issues by providing a system and method for determining the position and/or path of an object using asynchronous cameras.

In one embodiment, a method for determining a path of a moving object includes receiving images of the moving object from multiple cameras at different time points during a time interval, where the cameras capture the images asynchronously. The method further includes determining a position of the moving object in each image, and solving for coefficients of equations of motion of the moving object, based on the determined positions, where the equations of motion with the solved coefficients describe a path of the moving object during the time interval. For example, the images can be from video of a sporting event, and the moving object can be a game object used at the sporting event. The method can include reporting based on the solving, such as enhancing video of the moving object to depict at least a portion of the path of the moving object, providing statistics regarding the path of the moving object and/or storing the results, such as the solved coefficients, e.g., for later use.

In another embodiment, a system for determining a path of a moving object used at an event includes multiple cameras capturing images of the moving object at the event during a time interval, where the cameras capture the images asynchronously. Further, at least one processing facility receives the captured images from the cameras, a) determines a position of the moving object in each image, and b) solves for coefficients of equations of motion of the moving object, based on the determined positions, where the equations of motion with the solved coefficients describe a path of the moving object during the time interval.

In another embodiment, at least one processor readable storage device has processor readable code embodied thereon for programming at least one processor to perform the above-described method.

In another embodiment, a method for determining a position of a moving object includes receiving at least first, second and third images of the moving object from multiple cameras at different time points during a time interval, where the cameras capture the images asynchronously. The method further includes determining a position of the moving object in the at least first, second and third images, determining lines of position based on the determined positions in the at least first, second and third images, and determining a first position which satisfies a metric based on distances from the first position to the lines of position. For example, the metric may be based on minimizing a sum of the distances or a sum of squares of the distances.

In other embodiments, corresponding systems and processor readable storage devices are provided.

BRIEF DESCRIPTION OF THE DRAWINGS

FIG. 7 depicts a process for obtaining information for determining the path of an object.

FIG. 8 depicts a process for determining the path of an object.

FIG. 13 depicts a process for obtaining information for determining the position of an object.

FIG. 14 depicts a process for determining the position of an object.

DETAILED DESCRIPTION

The present invention provides a system and method for determining the position and/or path of an object using asynchronous cameras. Asynchronous cameras are free running and use their internal clocks for determining an image capture rate. Thus, asynchronous cameras can capture images at different time points rather than at common time points.

Figure 1:
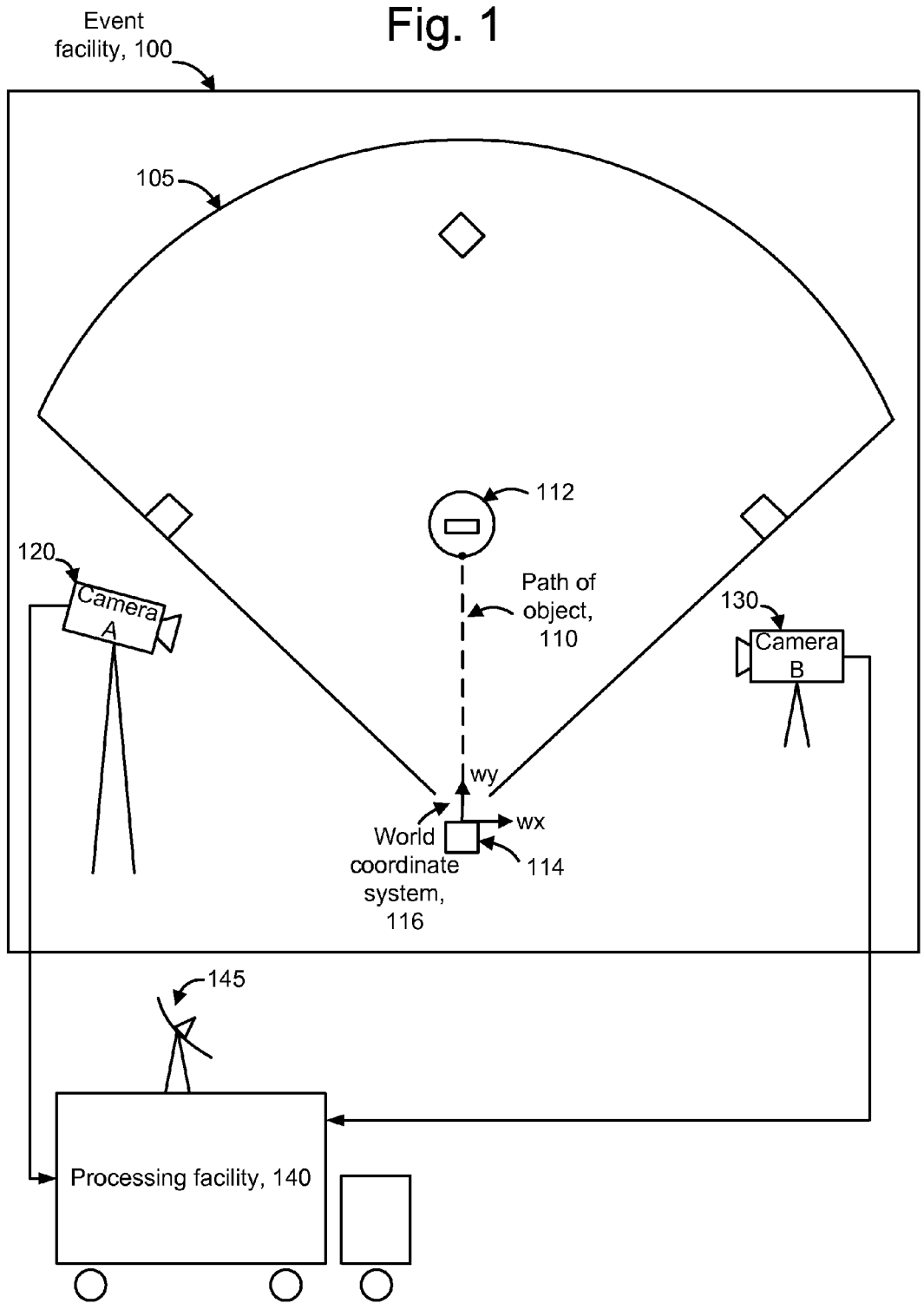
FIG. 1 depicts a system for tracking an object in an event facility.

FIG. 1 depicts a system for tracking an object in an event facility. In one example application, a game object such as a baseball is tracked at an event facility 100 such as a baseball stadium. It will be appreciated that many other applications are possible. For example, a surveillance application can track cars and people, and a sports application can track the trajectory of a golf ball, football, tennis ball, hockey puck or other object. The event facility includes a baseball diamond infield 105 having a pitcher's mound 112 and a home plate 114. A path 110 depicts the trajectory of a baseball thrown from the pitcher to the catcher. Two or more cameras are positioned to capture images of the event. For example, two cameras located at different heights, e.g., camera A 120 and camera B 130, are depicted. Camera A 120 and camera B 130 have different views of the path 110.

Additional cameras can be used as well to increase the accuracy of the tracking. The cameras can be television broadcast cameras, for instance, which capture thirty frames or sixty fields per second, in one possible approach. While such cameras sense visible light, it is also possible to use cameras that sense electromagnetic radiation outside a range of visible light, such as infrared radiation, depending on the application. Further, note that the rate of image capture which is needed to determine the position and/or path of the object is a function of the speed of the object. For instance, capturing images of a flying bullet at different points along its path would typically require a faster image capture rate than capturing images of a car driving on a highway. Moreover, a sufficient number of observations from different viewpoints should be used so that the observations are linearly independent. The path 110 of the object can be described in terms of a world coordinate system 116, also known as a free space coordinate system, which is fixed relative to the earth or other environment of interest, in one approach. The world coordinate system 116 includes orthogonal directions represented by a wy axis, a wx axis, and a wz axis which extends out of the page. An origin of the world coordinate system is chosen to be at the edge of home plate 114, but other locations may be used.

Each camera can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912,700, issued Jun. 15, 1999, incorporated herein by reference. The sensors can be used to determine the field of view of the camera, e.g., where the camera is pointing and what it can see.

It is also possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing marks in various measured or known locations in the event facility such that each mark looks different and at least one mark will always be visible to the camera while the camera is pointed at the event facility. A computer using optical recognition technology can find the mark in the video frame and, based on the mark's size and position in the video frame, determine the camera parameters. Another approach to determining intrinsic and extrinsic parameters of a camera involves placing marks in various measured or known locations in the event facility such that each mark looks different, but the marks may be removed after camera parameters have been determined. A computer implementing a camera parameter estimation algorithm based on manual user interaction rather than, or in addition to, image recognition can determine camera parameters.

Cameras 120 and 130 capture images of the object in the path 110 and communicate the images in analog or digital signals to a processing facility 140, which can be a mobile facility parked outside the event facility 100, in one possible approach. The processing facility 140 includes equipment which receives and stores the captured images, time stamps the captured images using a common clock, and processes the captured images to determine the position and/or path of the object. A common time signal can be used for all captured images by using a single clock in a computer which processes video from all the cameras. The accuracy and resolution of the time keeping should be sufficiently high to solve the equations of motion, discussed further below. For example, for tracking a baseball, accuracy of milliseconds is needed.

When the captured images are provided in video signals from the cameras 120 and 130, the processing facility 140 can enhance the video signals based on the determined position and/or path of the object, such as by displaying a graphic which depicts the position and/or path. Further, a series of images can be combined to depict different locations of the object along the path. Statistical information regarding the object can be also be obtained, including speed, direction, distance traveled, height, time in the air and so forth. The processing facility 140 can subsequently transmit the captured images and information regarding the path of the object, in addition to the enhanced video, via an antenna 145, to another location such as a television broadcast facility. In another approach, the processing facility can be remote from the event facility 100. Further, the enhancement of the video can be performed at a different location than a facility at which the object's position and/or path is determined.

Figure 2:
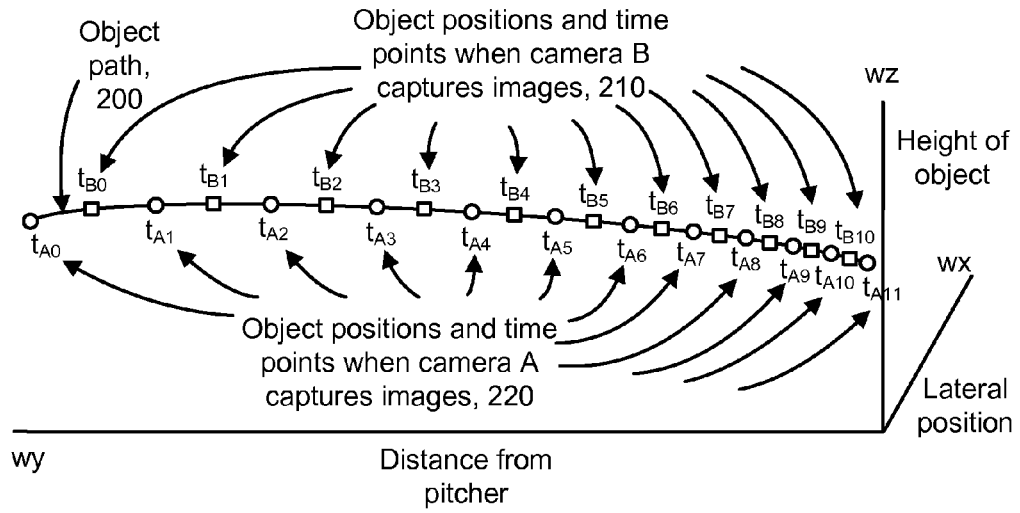
FIG. 2 depicts an object path from a first perspective in which a height of the object is depicted.

FIG. 2 depicts an object path from a first perspective in which a height of the object is depicted. The object path 200 is depicted in a world coordinate system which in this example is a Cartesian coordinate system having an axis wy which extends from home plate 114 to the pitcher's mound 112 and therefore represents a distance from home plate, an axis wz which represents a height of the object, e.g., baseball, above the ground, and an axis wx which represents a lateral position of the object. Other coordinate systems can also be used such as polar, spherical or other non-orthogonal coordinate systems. Cameras 120 and 130 are free running and use their internal clocks for determining an image capture rate. Thus, the cameras capture images of the object in the path 200 asynchronously, at different points in time, during a time interval in which the object is moving. Camera A captures images at time points represented by circles at $t_{A0}$, $t_{A1}$, $t_{A2}$, $t_{A3}$, $t_{A4}$, $t_{A5}$, $t_{A6}$, $t_{A7}$, $t_{A8}$, $t_{A9}$, $t_{A10}$ and $t_{A11}$, while camera B captures images at time points represented by squares at $t_{B0}$, $t_{B1}$, $t_{B2}$, $t_{B3}$, $t_{B4}$, $t_{B5}$, $t_{B6}$, $t_{B7}$, $t_{B8}$, $t_{B9}$ and $t_{B10}$. Note that it is not necessary for each camera to capture images at a fixed rate, or for the different cameras to capture images at the same rate. The example shown is meant to depict a fixed image capture rate by both cameras, where the object slows down as it nears the end of the path 210.

Figure 3:
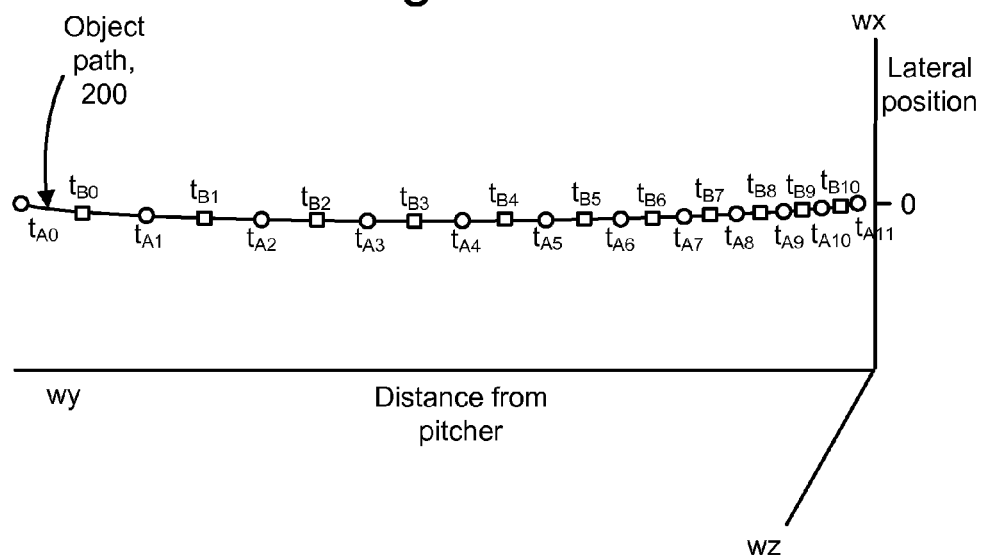
FIG. 3 depicts an object path from a second perspective in which a lateral position of the object is depicted.

FIG. 3 depicts an object path from a second perspective in which a lateral position of the object is depicted. The vertical axis is wx while the out-of-page axis is wz. Here, the lateral, e.g., sideways, movement of the object along the path 200 is apparent. For instance, when the path of a baseball is tracked, the lateral movement may represent a curving of a pitch. While three-dimensional or higher-dimensional tracking is possible, in some cases it may be sufficient to track the object's position and/or path in a two-dimensional plane or even along a one dimensional path.

Figure 4:
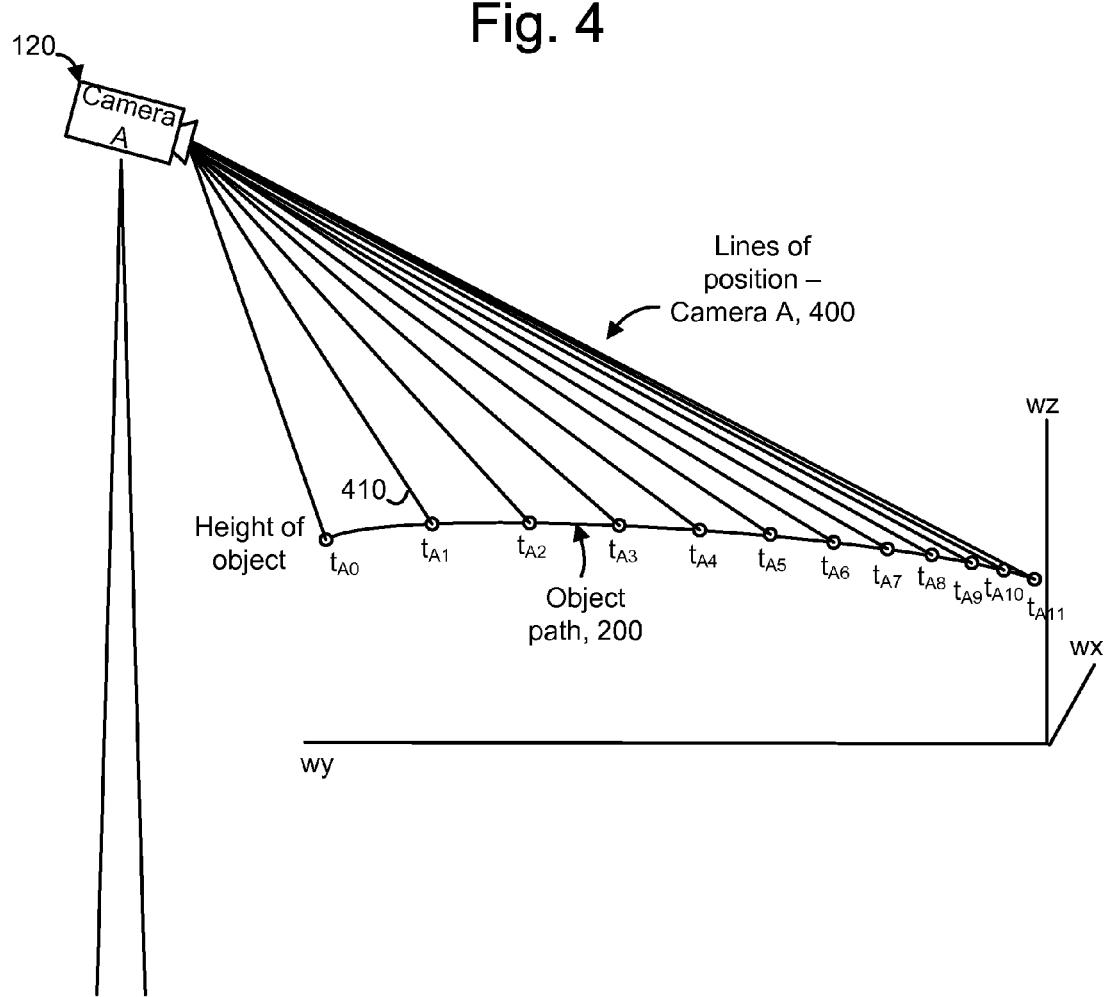
FIG. 4 depicts lines of position from a first camera to different locations of an object along a path.

FIG. 4 depicts lines of position from a first camera to different locations of an object along a path. A line of position represents an imaginary straight line that extends from a camera to the tracked object at a given point in time, and identifies a locus of points at which the object could be located based on the camera's observation. See, also, FIG. 6. Thus, for camera A 120, lines of position 400 extend from the camera, e.g., from the midpoint of the lens, to the different positions of the object at the different times the images of the object are captured by camera A 120. An example line of position 410 represents a line which extends though a midpoint of the object at $t_{A1}$. In an example implementation, a baseball pitch might take 0.5 sec to go from the pitcher to home plate, in which case thirty lines of position, fifteen each from two cameras, might be captured.

Figure 5:
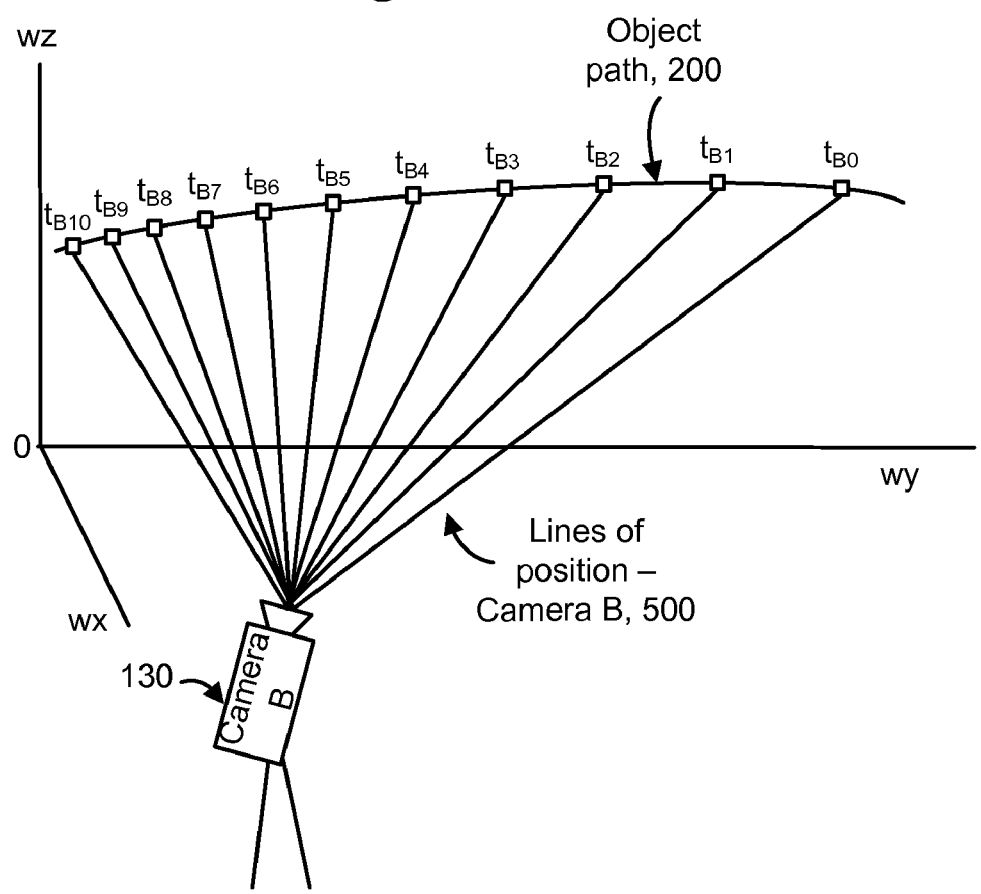
FIG. 5 depicts lines of position from a second camera to different locations of an object along a path.

FIG. 5 depicts lines of position from a second camera to different locations of an object along a path. The perspective is opposite to that shown in FIG. 4, as values along the wy axis increase to the right instead of to the left. For camera B 130, lines of position 500 extend from the camera, e.g., from the midpoint of the lens, to the different positions of the object at the different times the images of the object are captured by camera B 130. Generally, it is desirable for the cameras to be positioned to capture images of the object from different viewpoints. In this example, camera B is located at a lower height than camera A and on an opposite side of the ball's path than camera A. The specific camera locations which are most advantageous depend on the expected path of the object, lighting, the ability to identify the object in the captured image based on contrast of the tracked object relative to a background scene, and other factors. It is also possible to use additional cameras beyond two.

It is possible but not required for the tracked object to be specially configured to make it easier to detect. For example, the object can be configured with passive or active tracking aids. A passive tracking aid could include, e.g., retro reflectors that make the object easier to see, while an active tracking aid could include, e.g., an infrared or other electromagnetic transmitter carried by the object.

Figure 6:
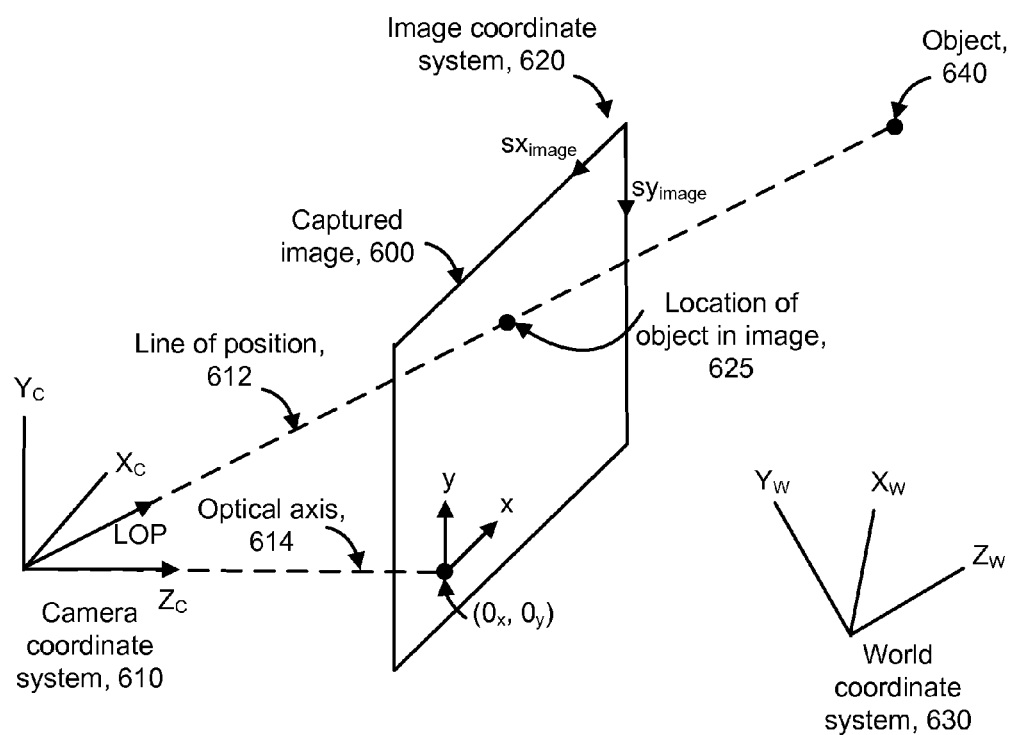
FIG. 6 depicts a relationship between camera, image and world coordinate systems.

FIG. 6 depicts a relationship between camera, image and world coordinate systems. A camera coordinate system 610, which includes orthogonal axes $X_C$, $Y_C$ and $Z_C$ in three dimensions, is fixed relative to the camera. The origin of the coordinate system may be at the center of the lens, in one possible approach, modeling the camera as a pinhole camera. An image coordinate system 620, also referred to as pixel space, includes orthogonal axes X and Y in two-dimensions, and is fixed relative to a captured image 600. A world coordinate system 630, which includes orthogonal axes $X_W$, $Y_W$ and $Z_W$, is fixed relative to, e.g., the earth, a baseball stadium or other event site, or other reference point or location. Generally, it is desirable to describe the position and/or path of the tracked object 640 in the world coordinate system 630 as this is typically the coordinate system in which its motion is most relevant to the user. The line of position 612 is an imaginary line which extends from the origin of the camera coordinate system 610 through a pixel in the image 600, intersecting the pixel at a point 625, and through the tracked object 640. Each pixel in the image 600 corresponds to a different line of position. Point 625 in the captured image 600 represents the location of the object 640 in the image. The location of the object in the image 600 can be represented by coordinates (sx, sy) in a coordinate system which has its origin at a corner of the image, in one approach. The coordinates may identify the center of the object.

Further, the line of position can be represented by a vector (LOP) which has unity magnitude, in one approach. The vector can be defined by two points along the LOP. The vector can be represented in the world coordinate system 630 using an appropriate transformation from the image coordinate system.

The $Z_C$ axis of the camera coordinate system, which is the optical axis 614 of the camera, intersects the captured image at a point represented by coordinates $(0_x, 0_y)$. A two-dimensional coordinate system extending from $(0_x, 0_y)$ can also be defined.

The camera registration process involves obtaining one or more transformation matrices, discussed further below, which provide a conversion between the image coordinate system 620 and the world coordinate system 630. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

FIG. 7 depicts a process for obtaining information for determining the path of an object. The steps indicated can be performed prior to tracking an object's position or at least prior to processing image data to track an object's position. Step 700 refers to registering the camera. Registration, also referred to as calibration, can involve aiming the camera at different reference marks in an event facility, capturing images of the marks, and recording intrinsic and extrinsic parameters of the camera at each mark, as well as the location of the object in the captured image. For example, home plate may be a reference mark. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. At step 710, a transformation matrix M, discussed further below, is defined based on the registration as $$M = \begin{pmatrix} m00 & m01 & m02 & m03 \\ m10 & m11 & m12 & m13 \\ m20 & m21 & m22 & 1 \end{pmatrix}. \quad (1)$$

M relates the image coordinate system to the world coordinate system.

At step 720, equations of motion of the tracked object are obtained. Equations of motion express the three-dimensional location of the object as a function of time. The equations of motion should be sufficiently accurate over the course of the measured trajectory. Approximate equations of motion and piecewise equations of motion that apply to portions of the trajectory are acceptable provided the estimated position of the object for any given relevant time is within required measurement accuracy. Further, the equations used should be suitable for the type of object tracked and the desired degree of tracking accuracy. For example, the equations of motion for a ball or other object under constant acceleration in the three-dimensional world coordinate system are:

$$wx(t) = x0 + vx0*t + (\tfrac{1}{2})ax*t^2 \quad (2)$$

$$wy(t) = y0 + vy0*t + (\tfrac{1}{2})ay*t^2 \quad (3)$$

$$wz(t) = z0 + vz0*t + (\tfrac{1}{2})(az+g)*t^2 \quad (4)$$

The nine parameters x0, y0, z0, vx0, vy0, vz0, ax, ay and az, are coefficients of the equations of motion. Coefficients x0, y0, z0 denote positions of the object in the three orthogonal directions at time t=0, the coefficients vx0, vy0, vz0 denote the velocity of the object in the three orthogonal directions at time t=0, and coefficients ax, ay, az denote the acceleration of the object in the three orthogonal directions at time t. The acceleration can indicate, e.g., how much force is on the ball, denoting how much it is curving. For convenience, g denotes gravitational acceleration at −9.8 m/sec$^2$. While the above equations of motion are linear, one or more non-linear equations can be used as well. For example, a velocity squared term may be used when it is desired to account for atmospheric drag on an object in flight.

FIG. 8 depicts a process for determining the path of an object. Step 800 includes running the cameras asynchronously. That is, the cameras run freely, using internal unsynchronized clocks for determining video capture rate. This technique avoids the need to genlock or otherwise synchronize the cameras so that they capture images at the same time. At a minimum, there are two cameras. At step 810, the cameras capturing images of the moving object at different points in time. At step 820, the processing facility receiving the images and records a time at which each image is received. Accurate time stamping of the video received from the cameras can occur at the processing facility. If multiple clocks are used for time stamping, they are synchronized. Or, a single clock can be used. As discussed below, the accurate time stamp is used together with equations of motion for the object to solve for the position at any time, not just the time points at which the images are captured. At step 830, processing of the captured images begins. This can include detecting the location of the object in the images as well as enhancing the images, as described below.

Step 840 includes detecting a location of the object in each image. In each captured image, a position of the object can be detected in the coordinate system/pixel space 620 of the captured image. For example, as discussed above in connection with FIG. 6, in a captured image 600, a location of the detected object 625 in the image is identified by the pixel coordinates (sx, sy), where sx denotes a horizontal position in the image and sy denotes a vertical position in the image. The object can be detected in the image in different ways. In one approach, the pixel or subpixel data of the image is processed to detect areas of contrast which correspond to the object. For example, a white baseball may contrast against the green grass of the playing field. The expected size of the object in pixels can be used to avoid false detections. For example, a contrasting area in the image which is significantly smaller or larger than the expected size of the object can be ruled out as representing the object. Moreover, once the position of the object in a given image is identified, its position in subsequent images can be predicted based on the position in the previous image.

Other various techniques for analyzing images to detect objects which will be apparent to those skilled in the art may be used. For example, various pattern recognition techniques can be used. Radar, infra-red and other technologies can also be used as discussed in U.S. Pat. No. 5,912,700, issued Jun. 15, 1999, and U.S. Pat. No. 6,133,946, issued Oct. 17, 2000, both of which are incorporated herein by reference.

An illustrative example involves tracking the trajectory of a baseball in flight. The technique includes measuring the position of the ball in multiple video frames from multiple cameras. The ball is seen from two or more cameras, and a measurement is made of the pixel coordinates of the center of the ball in each frame (or field) of video.

Step 850 includes obtaining a matrix U based on the transformation matrix M (see step 710 of FIG. 7) and the equations of motion (see step 720 of FIG. 7). For example, matrix and equations may be read from memory. Step 860 includes forming a matrix S from the pixel coordinates (sx, sy) of each image. As mentioned, the cameras have been registered (see step 700 of FIG. 7) to obtain a matrix M which provides a transformation from world coordinates to pixel coordinates, and vice-versa, for each image, such as a frame or field of video. Ignoring camera lens distortion, for the moment, a transformation which converts a position in world coordinates (wx, wy, wz) into a screen pixel (sx, sy) in homogeneous coordinates is:

$$k\begin{pmatrix} sx \\ sy \\ 1 \end{pmatrix} = M \begin{pmatrix} wx \\ wy \\ wz \\ 1 \end{pmatrix} = \begin{pmatrix} m00 & m01 & m02 & m03 \\ m10 & m11 & m12 & m13 \\ m20 & m21 & m22 & 1 \end{pmatrix} \begin{pmatrix} wx \\ wy \\ wz \\ 1 \end{pmatrix} \quad (5)$$

where $$S = \begin{pmatrix} sx \\ sy \\ 1 \end{pmatrix} \text{ and } W = \begin{pmatrix} wx \\ wy \\ wz \\ 1 \end{pmatrix}. \quad (6)$$

Generally, a point (x,y,z) can be represented in homogeneous coordinates by adding a 1 in the fourth column: (x,y,z)→(x,y,z,1). Similarly, an arbitrary point (x,y,z,a) in homogenous coordinates can be mapped back to a 3D point by dividing the first three terms by the fourth (a) term: (x,y,z,a)→(x/a, y/a, z/a).

In equation (5), k is an unknown scale factor which is eliminated in the solution below. The matrix M is a projective transformation whose scale is arbitrary, so we set the coordinate m33=1. The matrix S identifies the image point in screen coordinates, and the matrix W identifies the object as a source point in world coordinates. Written out, the above matrix equation (5) is three equations:

$$m00wx+m01wy+m02wz+m03=k*sx \quad (7)$$

$$m10wx+m11wy+m12wz+m13=k*sy \quad (8)$$

$$m20wx+m21wy+m22wz+1=k$$

Eliminating k from the three linear equations, we get two linear equations in eight unknowns, namely m00, m01, ... m22:

$$m00wx+m01wy+m02wz+m03-m20wxsx-m21wysx-m22wzsx=sx \quad (10)$$

$$m10wx+m11wy+m12wz+m13-m20wxsy-m21wysy-m22wzsy=sy \quad (11)$$

A ball flying along its trajectory is at (wx, wy, wz) at time t and its location in a captured image is (sx, sy). The equations of motion for a ball under constant acceleration were provided above by equations (2)-(4).

Observations from multiple cameras are used to generate two simultaneous linear equations per observation. To solve for all nine parameters, at least five observations are needed from the two or more cameras, e.g., two observations from a first camera and three from a second, four observations from one camera and one from a second, and so forth. The more measurements, the higher the accuracy of the solution for the coefficients. Typically, the problem is over determined, so a least square error estimate can be obtained for the solution.

Furthermore, sufficient observations from different viewpoints should be obtained to have linear independence.

Note also that the coefficients (vx0, vy0, vz0) represent the velocity at time t=0. Although the actual time at which t=0 is arbitrary, it will be numerically better to have the values for t at observation times be small. So, it can be arranged for t=0 when the first sample (image) is taken.

Substituting equations (2)-(4) for wx, wy, wz in equations (10) and (11) results in the following equation in matrix form:

$$U_0 \cdot (x0\, vx0\, ax\, y0\, vy0\, ay\, z0\, vz0\, az)^T = (sx0\, sy0)^T \quad (12)$$

or $U_0 \times A^T = S_0^T$, where "T" denotes the transpose, "A" denotes the coefficient matrix: |x0 vx0 ax y0 vy0 ay z0 vz0 az|, "$S_0$" denotes the pixel coordinates (sx0, sy0), and "$U_0$" is a 2×9 matrix whose elements are:

$u00=(m00-m20*sx)$ $u01=(m00-m20*sx)t$ $u02=(½)$
$(m00-m20*sx)*t^2$ $u03=(m01-m21*sx)$ $u04=(m01-m21*sx)t$ $u05=(½)$
$(m01-m21*sx)*t^2$ $u06=(m02-m22*sx)$ $u07=(m02-m22*sx)t$ $u08=(½)$
$(m02-m22*sx)*t^2$ $u10=(m10-m20*sy)$ $u11=(m10-m20*sy)t$ $u12=(½)$
$(m10-n0-*sy)*t^2$ $u13=(m11-m21*sy)$ $u14=(m11-m21*sy)t$ $u15=(½)$
$(m11-m21*sy)*t^2$ $u16=(m12-m22*sy)$ $u17=(m12-m22*sy)t$ $u18=(½)$
$(m12-m22*sy)*t^2$ (13)

Thus, the matrix $U_0$ represents a single observation from a single camera, which yields two equations, one for x and one for y. N observations yield 2*N equations as follows:

$$\begin{pmatrix} U_0 \\ U_1 \\ \ldots \\ U_{N-1} \end{pmatrix} \cdot (x0\ vx0\ ax\ y0\ vy0\ ay\ z0\ vz0\ az)^T = \begin{pmatrix} (sx0\ sy0)^T \\ (sx1\ sy1)^T \\ (\ldots)^T \\ (sxN-1\ syN-1)^T \end{pmatrix} \quad (14)$$

where each of the matrices $U_0, U_1, \ldots U_{N-1}$ represents a different observation or captured image from a camera.

Step 870 includes solving for the matrix A of coefficients of the equations of motion from equation (14), which is of the form $U \times A^T = S^T$. The equations are solved simultaneously for all observations. Thus, the solving involves solving for the matrix A, which includes the coefficients of the equations of motion, based on matrices $S_0 \ldots S_{N-1}$ which include the determined object positions in the images and matrices $U_0 \ldots U_{N-1}$ which include transform coefficients, where the transform coefficients associate the one or more coordinate systems of the images with a coordinate system in which the path is described.

In one possible approach, the set of 2N equations at (14) can be solved using Singular Value Decomposition (SVD). SVD is a technique for solving linear equations which produces a least squares estimate. Each ith observation has known values for the time ti, the associated perspective transformation matrix, Mi, and the associated pixel coordinates (sxi, syi). From these known values, two rows are added to the U matrix and the right hand side. A solution can be attempted when there are five or more observations. A solution is obtained only if the observations are sufficiently independent, which requires observations from multiple cameras.

If non-linearities are to be accounted for (we already account for distortion in our current system by first undistorting the screen points, using an iterative method, and then proceeding with the linear method, depicted above), such as when the equations of motion are non-linear (for example, accounting for atmospheric drag as a function of the square of velocity), one can start with the above linear estimate and complete the computation using, e.g., the Levenberg-Marquardt method with the linear estimate as the starting point.

Note that the solution above expresses the object's position in a Cartesian coordinate system. However, other coordinate systems can be used, such as polar, spherical or other non-orthogonal coordinate systems.

Step 880 includes reporting results from solving for the coefficients of the equations of motion. As mentioned, this can include displaying a graphic which depicts the position and/or path, providing statistical information regarding the object, as illustrated in connection with FIG. 10 and/or storing the results, such as the solved coefficients, e.g., for later use.

Figure 9:
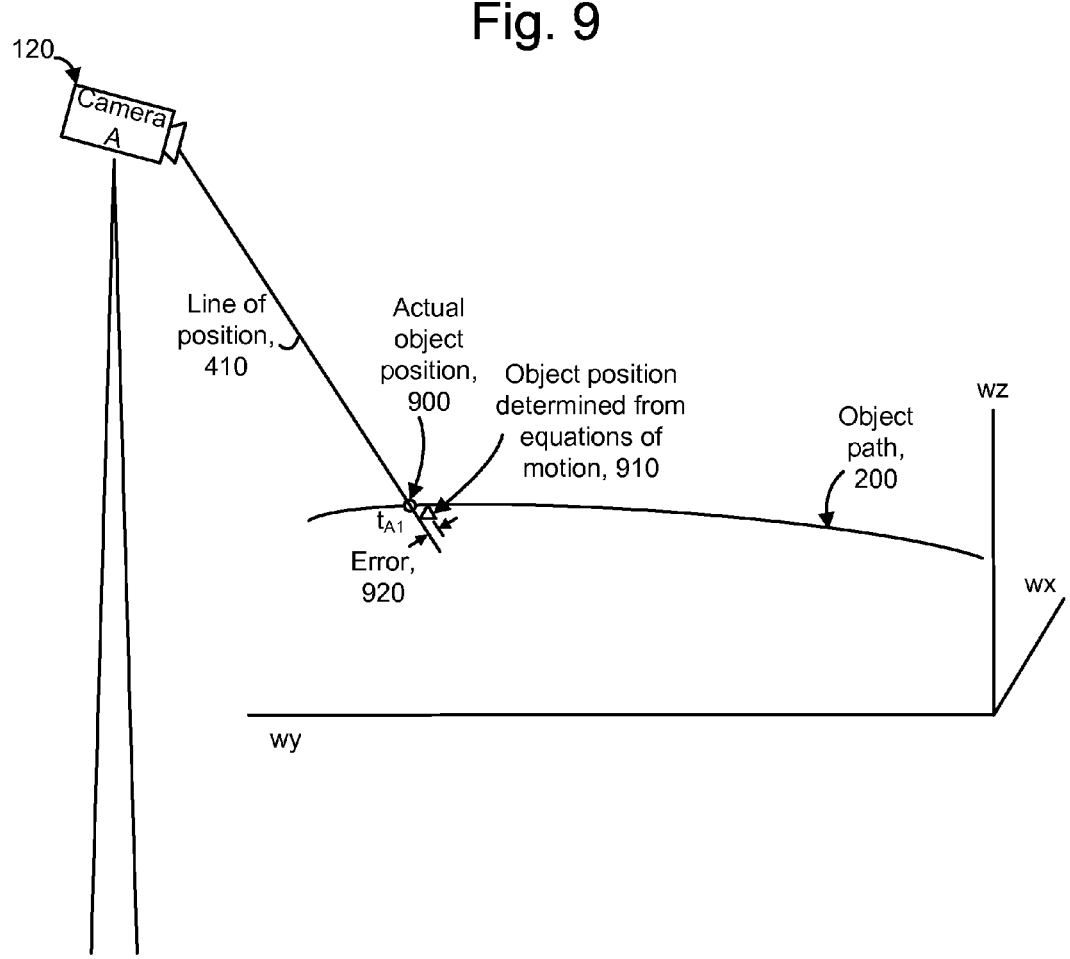
FIG. 9 depicts an error between a line of position and an object position determined from equations of motion.

FIG. 9 depicts an error between a line of position and an object position determined from equations of motion. In step 870 of FIG. 8, the coefficients of the equations of motion (2)-(4) are solved during a time interval of interest, such as when a ball is thrown from the pitcher's mound to home plate. The equations of motion with the solved coefficients therefore provide a three dimensional position of the object at any time during the monitored time interval by substituting the time of interest into equations (2)-(4), for instance. Further, by substituting in the times at which the images were captured into the equations of motion, we should get back the coordinates of the object that are on the measured lines of position. However, since there are always uncertainties in measurements, there will be some differences in the camera measurements and the path predicted based on the equations of motion. When we have more than the necessary number of measurements, the coefficients can be solved for in a way that minimizes the sum of the squares of the errors (a least squares estimate) or other error criteria. This is an automatic result of solving the equations using linear algebra.

In particular, for each captured image, e.g., for each time point at which an image is captured by the different cameras, there is an error between a line of position which is determined from the captured image and a three-dimensional position (wx(t), wy(t), wz(t)) which is calculated from the equations of motion (2)-(4) with the solved coefficients. For example, with the actual object position 900 in the path 200 at time $t_{A1}$, the line of position 410 passes through the center of the object, represented by a circle. A corresponding object position 910 represented by a triangle is determined from the equations of motion at $t_{A1}$. An error 920 represents a shortest distance between the line of position 410 and the object position 910 determined from the equations of motion at $t_{A1}$. Such an error can be determined for each time point at which an image is captured by the different cameras. The solution for the coefficients of the equations of motion can minimize a sum of the square of these errors, in one possible approach, as mentioned. Thus, solving the equations of motion includes satisfying a least square error criteria for errors between lines of position of the moving object which are based on the determined positions of the object in the images and positions of the moving object which are based on the equations of motion. Essentially, the solution to the equations of motion can provide a best fit curve based on the lines of position.

Figure 10:
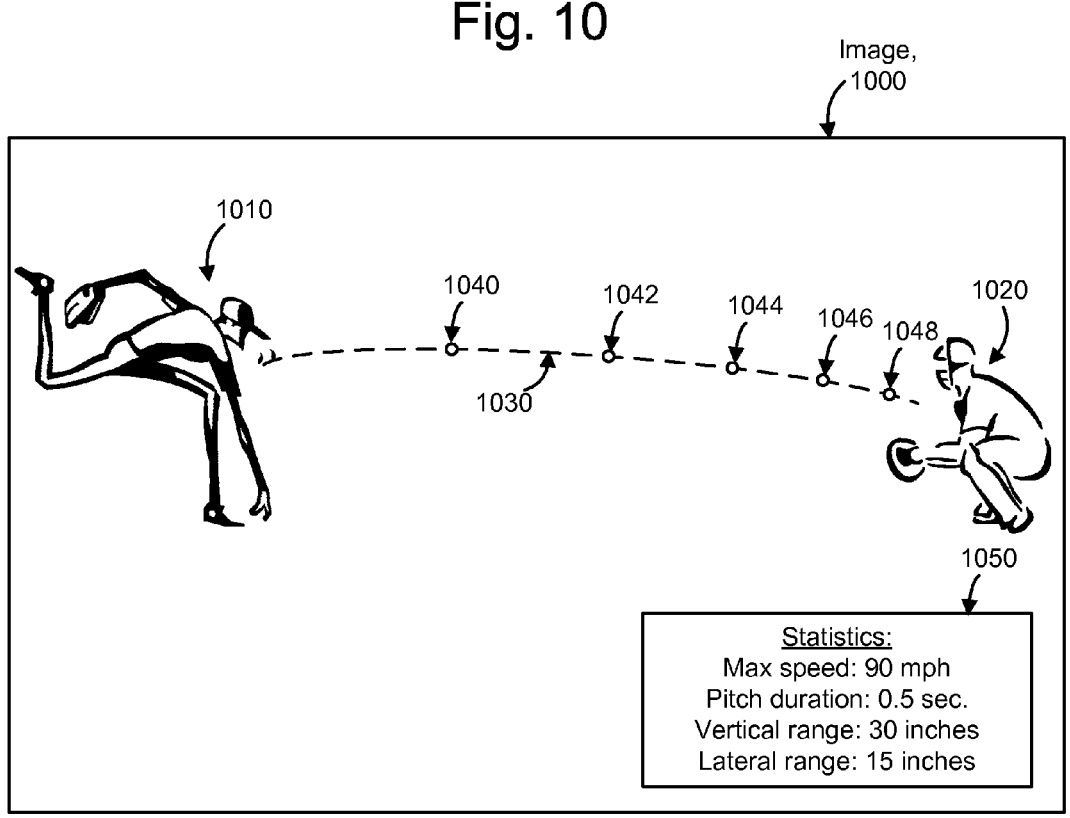
FIG. 10 depicts an enhanced image in which a path of an object and statistics are depicted.

FIG. 10 depicts an enhanced image in which a path of an object and statistics are depicted. The captured images can be enhanced based on the solved equations of motion of the tracked object. For example, a video signal can be enhanced based on the determined path of the object, such as by displaying a graphic which depicts the path. Further, a series of images can be combined to depict different locations of the object along the path. The image 1000 depicts a path 1030 of the ball which is thrown from a pitcher 1010 to a catcher 1020. The dashed line 1030 can appear in the image in addition to images of the ball 1040, 1042, 1046, 1048 at different points in time. In another option, a graphic is provided in place of the ball or in addition to the ball. Further, a sequence of images which precedes the image 1000 can be provided in which a portion of the dashed line which trails the current position of the ball is provided. In this manner, the incremental progress of the ball along the path 1030 can be visualized. Further, a graphic 1050 provides statistics which are determined from the equations of motion with the solved coefficients. For example, the statistics can include a maximum speed, pitch duration, vertical range and lateral range. Various algorithms can also be applied to determine the type of pitch. For instance, a fast ball may be reported if the maximum speed exceeds a threshold or a curve ball may be reported if the lateral range exceeds a threshold. The direction and distance of the object can also be reported.

The maximum speed can be determined by calculating a velocity vector with components (vx, vy, vz) at different time points in the object's path. The magnitude of the velocity vector is then the square root of $(vx^2+vy^2+vz^2)$. The time point with the maximum magnitude therefore provides the maximum velocity or speed. The pitch duration, which is the time the ball is in flight, can be determined by the difference between the times at the start and end points of the path 1030. The vertical range can be determined by the difference between the maximum and minimum values for the height component wz. The lateral range can be determined by the different between the maximum and minimum values for the lateral position component wx. Various other statistics can be provided as well. Further, the statistics can be provided in different formats, such as bar charts, dashboard gauges and the like. Comparisons to the statistics from other paths can be provided. These can be other paths from the same pitcher in the current game or earlier games, or from other pitchers.

The present example, which refers to tracking the path of a baseball pitch, is only one example among many possible applications of the techniques provided herein. The techniques discussed generally apply to an object which moves on the ground, in the air and/or on or in the water. Moreover, tracking of multiple objects in the captured images can be performed by applying the techniques discussed separately for each object.

Figure 11:
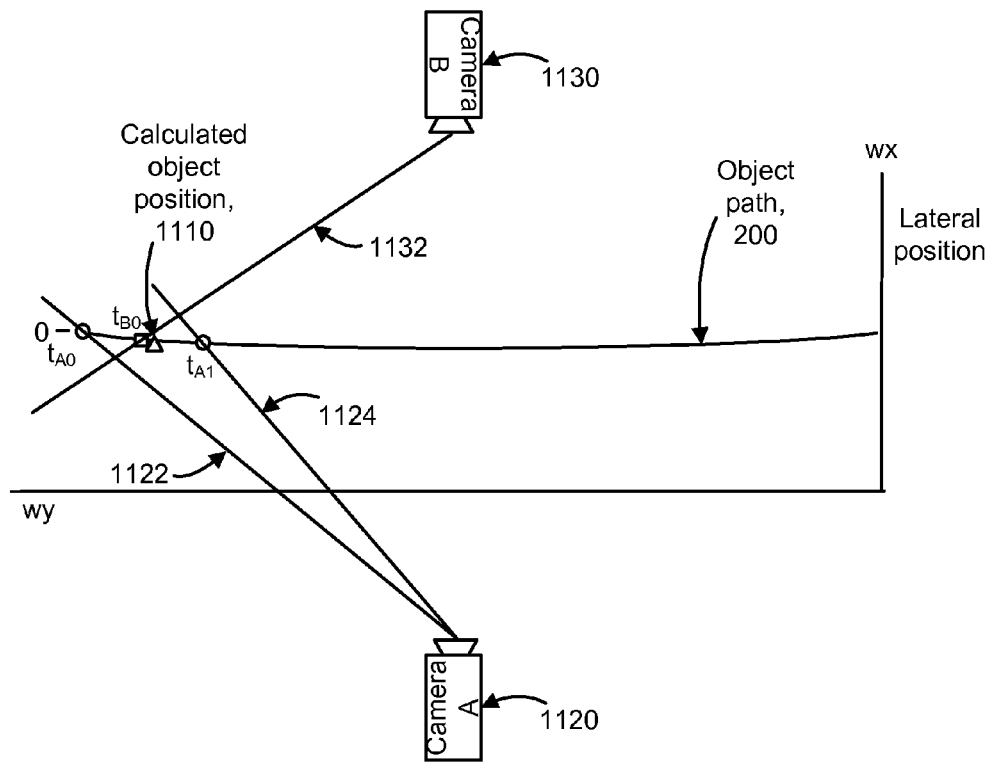
FIG. 11 depicts a technique for determining the position of an object based on lines of position from three or more images.

FIG. 11 depicts a technique for determining the position of an object based on lines of position from three or more images. In addition to determining the path of a moving object, it is possible to determine an instantaneous position of the object, e.g., in three-dimensions, at a given time point. This approach does not require solving equations of motion. A simplified example is provided in which a position in two-dimensions is determined. However, the technique can be extended to three or more dimensions as well. In this approach, lines of position from two or more cameras are used to identify a position of an object. A position can also be determined from only two lines of position by determining the point of closest approach to the lines of position. However, for improved accuracy, three or more lines of position may be used that are from images which are sufficiently close together to yield a desired accuracy. This approach provides an interpolation between two lines of position using the third line of position. More than three lines of position can be used as well to further improve the accuracy of the position estimation.

Here, the object path 200 is indicated in the wx-wy plane. Lines of position 1122 and 1124 extend from camera A 1120 at time points $t_{A0}$ and $t_{A1}$, respectively, while a line of position 1132 extends from a camera B 1130 at $t_{B0}$. Object positions, which are not known, are indicated by the circles at $t_{A0}$ and $t_{A1}$ and by the square at $t_{B0}$. The images which are used for the position estimation can be successive images which are captured at successive time points, in one possible approach. For higher accuracy, the time points should be close together relative to the motion of the moving object. Further, the successive images can include a first image from a first camera, a second image from a second camera and a third image from the first camera, for instance. Or, the first and second images can be from the first camera and the third image can be from the second camera. Many other variations are possible.

A calculated object position 1110, indicated by a triangle, can be determined as a position which meets a distance criteria with respect to the lines of position 1122, 1124 and 1132. For example, the metric can include minimizing a sum of the shortest distances from the object to each of the lines of position, or the sum of the squares of such distances, as explained further below. The object position can then be determined as a point at which the three or more lines of position come closest together.

Figure 12:
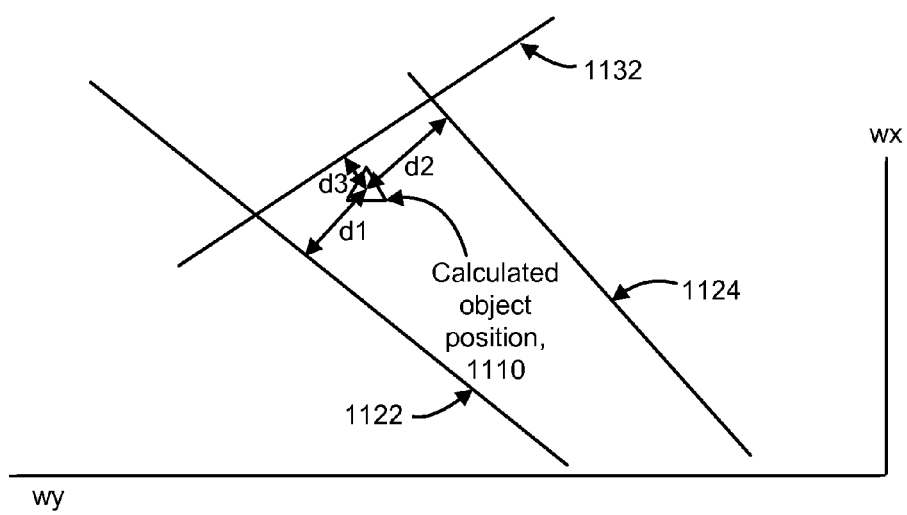
FIG. 12 depicts a close up view of FIG. 11, showing distances between an object position and lines of position.

FIG. 12 depicts a close up view of FIG. 11, showing distances between an object position and lines of position. The calculated object position 1110 is at distances d1, d2 and d3 from the lines of position 1122, 1124 and 1132, respectively. A distance metric which is expressed as, e.g., (d1+d2+d3) or $(d1^2+d2^2+d3^2)$ can be minimized to find the desired object position. In some cases, the desired object position will be on one of the lines of position. Geometric principles can be used to obtain equations which express the distance (or square of the distance) from each of the lines of position to an unknown position. A minima for the equations can then be determined to obtain the desired object position which meets the distance metric.

FIG. 13 depicts a process for obtaining information for determining the position of an object. The steps indicated can be performed prior to determining an object's location or at least prior to processing image data to determine an object's location. Step 1300 refers to registering the camera and step 1310 refers to obtaining a transformation matrix M, as discussed above, e.g., in connection with FIG. 7.

FIG. 14 depicts a process for determining the position of an object. Analogous steps correspond to those discussed previously in connection with FIG. 8. Step 1400 includes running the cameras asynchronously, step 1410 includes the cameras capturing images of the moving object at different points in time and step 1420 includes the processing facility receiving the images and recording a time at which each image is received. At step 1430, processing of a set of captured images, such as three or more images, begins. The images can be successive images, for instance. At step 1440, a location of the object is detected at a location identified by the pixel coordinates (sx, sy) for each image in the set of images. At step 1450, a line of position is determined for each image in the set from the pixel coordinates (sx, sy) and the matrix M. A line of position can be determined as indicated in connection with FIG. 6. For instance, the line of position can be expressed by a vector with unity magnitude. At step 1460, an object position is determined which meets a metric based on distances from the lines of position of the set. For example, the metric can include minimizing a sum of the shortest distances from the object position to each of the lines of position, or the sum of the squares of such distances. Step 1470 includes reporting results from determining the position of the object. Further, steps 1430-1460 can be repeated for other sets of images to determine object positions at other time points. Also, an image used, e.g., as the last image in one set can be used, e.g., as the first image in the next set.

Figure 15:
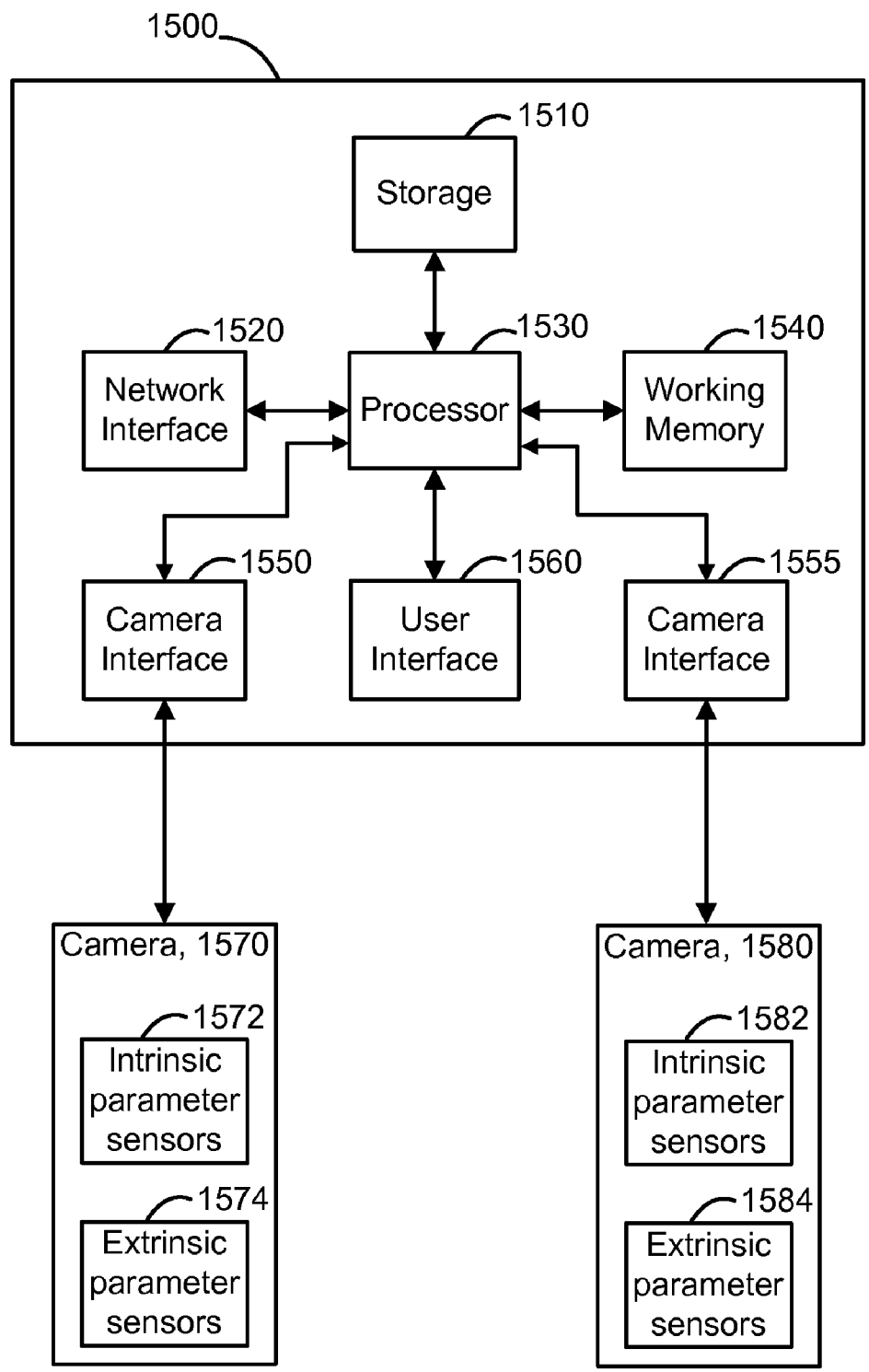
FIG. 15 depicts a computer system for determining the position and/or path of an object.

FIG. 15 depicts a computer system for determining the position and/or path of an object. The computer system 1500 is a simplified representation of a system which might be used at the processing facility 140 (FIG. 1), for instance. The computer system 1500 includes a storage device 1510 such as a hard disk or portable media, a network interface 1520 for communicating with other computer systems, a processor 1530 for executing software instructions, a working memory 1540 such as RAM for storing the software instructions after they are loaded from the storage device 1510, for instance, camera interfaces 1550 and 1555, and a user interface display 1560. The storage device 1510 may be considered to be a processor readable storage device having processor readable code embodied thereon for programming the processor 1530 to perform methods for providing the functionality discussed herein. The user interface display 1560 can provide information to a human operator based on the data received from the cameras via the interfaces 1550 and 1555. The user interface display 1560 can use any known display scheme, whether graphical, tabular or the like. In addition to an on-screen display, an output such as a hard copy from printer can be provided to report results. Results can also be reported by storing the solved coefficients at the storage device 1510 or other memory, e.g., for later use.

An example camera 1570 includes extrinsic parameter sensors 1572 and intrinsic parameter sensors 1574. The extrinsic parameter sensors 1572 can identify an orientation of the camera, such as a pan and tilt of the camera. The intrinsic parameter sensors 1574 can identify a zoom setting, whether an expander is used and so forth. Note that sensors are not needed when the parameter of concern is not changing. The camera 1570 communicates image data, whether analog or digital, in addition to data from the extrinsic parameter sensors 1572 and the intrinsic parameter sensors 1574 to the computer system 1500 via the camera interface 1550. Similarly, another camera 1580 with extrinsic parameter sensors 1582 and intrinsic parameter sensors 1584 can communicate data to the camera interface 1555. Data from more than two cameras can be received as well. It is also possible to determine camera extrinsic and intrinsic parameters without sensors 1582 or 1584, as described above in reference to Tsai's method.

Further, the functionality described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method for determining a path of a moving object, comprising:

receiving images of the moving object from at least first and second cameras at different time points during a time interval, as the moving object travels in a path during the time interval, the at least first and second cameras capture the images asynchronously, the first camera has a pixel space which is related to a world coordinate system by an associated transformation matrix and the second camera has a pixel space which is related to the world coordinate system by an associated transformation matrix;

using one or more processors to provide a matrix S, for each image captured by the first camera, which indicates a position of the moving object in the pixel space of the first camera, and for each image captured by the second camera, which indicates a position of the moving object in the pixel space of the second camera;

using the one or more processors to solve for coefficients of equations of motion of the moving object to provide solved coefficients, based on the positions, the equations of motion with the solved coefficients describe the path of the moving object during the time interval, the coefficients of the equations of motion include velocity and acceleration coefficients and are in a matrix A, and the solving includes providing a matrix U for each image which relates the matrix A to the matrix S of the image by an equation $U \times A^T = S^T$, where $A^T$ is a transpose of the matrix A and $S^T$ is a transpose of the matrix S of the image, and solving for the matrix A from the equation $U \times A^T = S^T$; and enhancing a video signal based on the equations of motion to depict the path of the moving object.

2. The method of claim 1, wherein:
each position represents a point on a line of position from one of the at least first and second plurality of cameras to the moving object.

3. The method of claim 2, wherein:
the solving comprises satisfying a least square error criteria for errors between: (a) the lines of position and (b) positions of the moving object which are based on the equations of motion.

4. The method of claim 1, wherein:
the equations of motion with the solved coefficients describe the path of the moving object in three orthogonal directions in the world coordinate system at any time t during the time interval as a function of the time t.

5. The method of claim 4, wherein:
the world coordinate system has orthogonal x-, y- and z-directions; and
the matrix A includes coefficients, including: (a) x0, y0 and z0, which are positions in the x-, y- and z-directions, respectively, for a first of the images, (b) vx0, vy0 and vz0, which are velocities in the x-, y- and z-directions, respectively, for the first of the images, and (c) ax, ay and az, which are accelerations in the x-, y- and z-directions, respectively.

6. The method of claim 5, wherein:
the equations of motions include:

$$wx(t)=x0+vx0*t+(½)ax*t^2,$$

$$wy(t)=y0+vy0*t+(½)ay*t^2, \text{ and}$$

$$wz(t)=z0+vz0*t+(½)(az+g)*t^2,$$

where g denotes gravitational acceleration, and wx(t), wy(t) and wz(t) denotes positions of the moving object in the x-, y- and z-directions, respectively, at the time t.

7. The method of claim 4, wherein:
(a) for each image captured by the first camera:
the matrix S of the image includes horizontal and vertical pixel coordinates, sx and sy, respectively, of the position of the moving object in the pixel space of the first camera; and
the matrix U for the image has elements which include sx and sy in the pixel space of the first camera, the time t, and elements of the associated transformation matrix of the first camera; and
(b) for each image captured by the second camera:
the matrix S of the image includes horizontal and vertical pixel coordinates, sx and sy, respectively, of the position of the moving object in the pixel space of the second camera; and
the matrix U for the image has elements which include sx and sy in the pixel space of the second camera, the time t, and elements of the associated transformation matrix of the second camera.

8. The method of claim 1, wherein:
the coefficients describe a position, velocity and acceleration of the moving object along the path of the moving object at any time during the time interval.

9. The method of claim 1, further comprising:
identifying the different time points at which the images are received using a common clock signal which is independent of the at least first and second cameras.

10. The method of claim 1, wherein:
the equations of motion are linear equations and the solving uses Singular Value Decomposition.

11. The method of claim 1, wherein:
the equations of motion include at least one non-linear equation, and the solving comprises performing a computation which starts with a linear estimate and is completed using a Levenberg-Marquardt method with the linear estimate as a starting point.

12. The method of claim 1, wherein:
the enhancing comprises using the equations of motion to determine locations of the moving object along the path at time points which are between successive time points of the different time points.

13. The method of claim 1, wherein:
the matrix A is solved simultaneously for all of the images.

14. The method of claim 1, wherein:
a number N of the images are received;
N of the matrices S are provided, one for each image, including matrices (sx0 sy0), (sx1sy1), . . . , (sxN−1 syN−1), where sx0, sx1, . . . , sxN−1 and sy0, sy1, . . . , syN−1 are horizontal and vertical pixel coordinates, respectively, of the positions of the moving object in the pixel spaces;
N of the matrices U are provided, one for each image, including matrices $U_0, U_1, \ldots, U_N$; and
one of the matrices A is provided.

15. The method of claim 14, wherein the solving includes solving an equation:

$$\begin{pmatrix} U_0 \\ U_1 \\ \ldots \\ U_{N-1} \end{pmatrix} A^T = \begin{pmatrix} (sx0 \ sy0)^T \\ (sx1 \ sy1)^T \\ (\ldots)^T \\ (sxN-1 \ syN-1)^T \end{pmatrix}.$$

16. A system for determining a path of a moving object used at an event, comprising:
at least first and second cameras capturing images of the moving object at the event at different time points during a time interval to provide captured images, as the moving object travels in a path during the time interval, the at least first and second of cameras capture the images asynchronously, the first camera has a pixel space which is related to a world coordinate system by an associated transformation matrix and the second camera has a pixel space which is related to the world coordinate system by an associated transformation matrix; and
at least one processor which receives the captured images from the at least first and second of cameras, the at least one processor: a) provides a matrix S, for each image captured by the first camera, which indicates a position of the moving object in the pixel space of the first camera, and for each image captured by the second camera, which indicates a position of the moving object in the pixel space of the second camera, and b) solves for coefficients of equations of motion of the moving object to provide solved coefficients, based on the positions, the equations of motion with the solved coefficients describe the path of the moving object during the time interval, the coefficients of the equations of motion include velocity and acceleration coefficients and are in a matrix A, and the at least one processor solves for the coefficients of equations of motion by providing a matrix U for each image which relates the matrix A to the matrix S of the image by an equation $U \times A^T = S^T$, where $A^T$ is a transpose of the matrix A and $S^T$ is a transpose of the matrix S of the image, and solves for the matrix A from the equation $U \times A^T = S^T$.

17. The system of claim 16, wherein:
each position represents a point on a line of position from one of the at least first and second of cameras to the moving object.

18. The system of claim 17, wherein:
the at least one processor solves for the coefficients in accordance with a least square error criteria for errors between: (a) the lines of position and (b) positions of the moving object which are based on the equations of motion.

19. The system of claim 16, wherein:
the equations of motion with the solved coefficients describe the path of the moving object in three orthogonal directions in the world coordinate system at any time t during the time interval as a function of the time t.

20. The system of claim 19, wherein:
(a) for each image captured by the first camera:
   the matrix S of the image includes horizontal and vertical pixel coordinates, sx and sy, respectively, of the position of the moving object in the pixel space of the first camera; and
   the matrix U for the image has elements which include sx and sy in the pixel space of the first camera, the time t, and elements of the associated transformation matrix of the first camera; and
(b) for each image captured by the second camera:
   the matrix S of the image includes horizontal and vertical pixel coordinates, sx and sy, respectively, of the position of the moving object in the pixel space of the second camera; and
   the matrix U for the image has elements which include sx and sy in the pixel space of the second camera, the time t, and elements of the associated transformation matrix of the second camera.

21. The system of claim 16, wherein:
the coefficients describe a position, velocity and acceleration of the moving object along the path of the moving object at any time during the time interval.

22. The system of claim 16, wherein:
the at least one processor identifies the different time points at which the captured images are received from the at least first and second cameras using a common clock signal which is independent of the at least first and second of cameras.

23. The system of claim 16, wherein:
the captured images are from video of the moving object, and the at least one processor enhances the video to depict at least a portion of the path of the moving object.

24. The system of claim 16, wherein:
the at least one processor enhances a video signal based on the equations of motion to depict the path of the moving object, the enhancing comprises displaying an on-screen graphic which depicts the path.

25. The system of claim 16, wherein:
the at least one processor using the equations of motion to determine locations of the moving object along the path at time points which are between successive time points of the different time points.

26. The system of claim 16, wherein:
a number N of the captured images are received by the at least one processor;
N of the matrices S are provided, one for each captured image, including matrices (sx0 sy0), (sx1 sy1), ..., (sxN−1 syN−1), where sx0, sx1, ..., sxN−1 and sy0, sy1, ..., syN−1 are horizontal and vertical pixel coordinates, respectively, of the positions of the moving object in the pixel spaces;
N of the matrices U are provided, one for each captured image, including matrices $U_0, U_1, \ldots, U_N$; and
one of the matrices A is provided.

27. The system of claim 26, wherein the at least one processor solves for the matrix A by solving an equation:

$$\begin{pmatrix} U_0 \\ U_1 \\ \ldots \\ U_{N-1} \end{pmatrix} A^T = \begin{pmatrix} (sx0 \quad sy0)^T \\ (sx1 \quad sy1)^T \\ (\ldots)^T \\ (sxN-1 \quad syN-1)^T \end{pmatrix}.$$

28. At least one processor readable storage device having processor readable code embodied thereon for programming at least one processor to perform a method, the method comprising:
receiving images of a moving object from at least first and second cameras at different time points during a time interval, as the moving object travels in a path during the time interval, the at least first and second cameras capture the images asynchronously, the first camera has a pixel space which is related to a world coordinate system by an associated transformation matrix and the second camera has a pixel space which is related to the world coordinate system by an associated transformation matrix;
providing a matrix S, for each image captured by the first camera, which indicates a position of the moving object in the pixel space of the first camera, and for each image captured by the second camera, which indicates a position of the moving object in the pixel space of the second camera; and
solving for coefficients of equations of motion of the moving object to provide solved coefficients, based on the positions, the equations of motion with the solved coefficients describe the path of the moving object during the time interval, the coefficients of the equations of motion include velocity and acceleration coefficients and are in a matrix A, and the solving includes providing a matrix U for each image which relates the matrix A to the matrix S of the image by an equation $U \times A^T = S^T$, where $A^T$ is a transpose of the matrix A and $S^T$ is a transpose of the matrix S of the image, and solving for the matrix A from the equation $U \times A^T = S^T$.

29. The at least one processor readable storage device of claim 28, wherein:
each position represents a point on a line of position from one of the first and second cameras to the moving object.

30. The at least one processor readable storage device of claim 29, wherein:
the solving comprises satisfying a least square error criteria for errors between: (a) the lines of position and (b) positions of the moving object which are based on the equations of motion.

31. The at least one processor readable storage device of claim 28, wherein:
the equations of motion with the solved coefficients describe the path of the moving object in three orthogonal directions in the world coordinate system at any time t during the time interval as a function of the time t.

32. The at least one processor readable storage device of claim 31, wherein:
(a) for each image captured by the first camera:
the matrix S of the image includes horizontal and vertical pixel coordinates, sx and sy, respectively, of the position of the moving object in the pixel space of the first camera; and
the matrix U for the image has elements which include sx and sy in the pixel space of the first camera, the time t, and elements of the associated transformation matrix of the first camera; and
(b) for each image captured by the second camera:
the matrix S of the image includes horizontal and vertical pixel coordinates, sx and sy, respectively, of the position of the moving object in the pixel space of the second camera; and
the matrix U for the image has elements which include sx and sy in the pixel space of the second camera, the time t, and elements of the associated transformation matrix of the second camera.

33. The at least one processor readable storage device of claim 28, wherein:
the coefficients describe a position, velocity and acceleration of the moving object along the path of the moving object at any time during the time interval.

34. The at least one processor readable storage device of claim 28, wherein:
the images are from video of the moving object, and the method performed further comprises enhancing the video to depict at least a portion of the path of the moving object.

35. The at least one processor readable storage device of claim 27, wherein:
the method performed further comprises providing statistics regarding the path of the moving object.

36. The at least one processor readable storage device of claim 28, wherein the method performed further comprises:
enhancing a video signal based on the equations of motion to depict the path of the moving object, the enhancing comprises determining locations of the moving object along the path at time points which are between successive time points of the different time points.

37. The at least one processor readable storage device of claim 28, wherein:
a number N of the images are received;
N of the matrices S are provided, one for each image, including matrices (sx0 sy0), (sx1 sy1), . . . , (sxN−1 syN−1), where sx0, sx1, . . . , sxN−1 and sy0, sy1, . . . , syN−1 are horizontal and vertical pixel coordinates, respectively, of the positions of the moving object in the pixel spaces;
N of the matrices U are provided, one for each image, including matrices $U_0, U_1, \ldots, U_N$; and
one of the matrices A is provided.

38. The at least one processor readable storage device of claim 37, wherein the solving includes solving an equation:

$$\begin{pmatrix} U_0 \\ U_1 \\ \ldots \\ U_{N-1} \end{pmatrix} A^T = \begin{pmatrix} (sx0 \ sy0)^T \\ (sx1 \ sy1)^T \\ (\ldots)^T \\ (sxN-1 \ syN-1)^T \end{pmatrix}.$$

* * * * *